(12) United States Patent
Giovannini et al.

(10) Patent No.: US 11,556,825 B2
(45) Date of Patent: Jan. 17, 2023

(54) DATA LABEL VERIFICATION USING FEW-SHOT LEARNERS

(71) Applicant: International Business Machines Corporation, Armonk, NY (US)

(72) Inventors: Andrea Giovannini, Zurich (CH); Georgios Chaloulos, Zurich (CH); Frederik Frank Flother, Schlieren (CH); Patrick Lustenberger, Herrliberg (CH); David Mesterhazy, Nuremberg (DE); Stefan Ravizza, Wallisellen (CH); Eric Slottke, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 16/696,133

(22) Filed: Nov. 26, 2019

(65) Prior Publication Data
US 2021/0158195 A1 May 27, 2021

(51) Int. Cl.
*G06N 20/00* (2019.01)
*G06N 7/00* (2006.01)

(52) U.S. Cl.
CPC .............. *G06N 7/005* (2013.01); *G06N 20/00* (2019.01)

(58) Field of Classification Search
CPC ................................ G06N 7/005; G06N 20/00
See application file for complete search history.

(56) References Cited

U.S. PATENT DOCUMENTS 8,331,657 B2 12/2012 Baker
10,248,664 B1* 4/2019 Shen .................... G06N 3/0454
(Continued)

FOREIGN PATENT DOCUMENTS

WO 2018226492 A1 12/2018
WO 2018231708 A2 1/2019

OTHER PUBLICATIONS

Salakhutdinov, R., Tenenbaum, J. and Torralba, A., Jun. 2012, One-shot learning with a hierarchical nonparametric bayesian model. In Proceedings of ICML Workshop on Unsupervised and Transfer Learning (pp. 195-206). JMLR Workshop and Conference Proceedings. (Year: 2012).*

(Continued)

*Primary Examiner* — Alan Chen
(74) *Attorney, Agent, or Firm* — Edward P. Li

(57) ABSTRACT

Aspects of the present invention disclose a method for verifying labels of records of a dataset. The records comprise sample data and a related label out of a plurality of labels. The method includes one or more processors dividing the dataset into a training dataset comprising records relating to a selected label and an inference dataset comprising records with sample data relating to the selected label and all other labels out of the plurality of labels. The method further includes dividing the training dataset into a plurality of learner training datasets that comprise at least one sample relating to the selected label. The method further includes training a plurality of label-specific few-shot learners with one of the learner training datasets. The method further includes performing inference by the plurality of trained label-specific few-shot learners on the inference dataset to generate a plurality of sets of predicted label output values.

20 Claims, 7 Drawing Sheets

(56) References Cited

U.S. PATENT DOCUMENTS

| | | | |
|---|---|---|---|
| 11,176,495 B1* | 11/2021 | Ron | G06Q 30/016 |
| 2003/0204384 A1* | 10/2003 | Owechko | G06K 9/209 |
| | | | 703/1 |
| 2012/0215727 A1* | 8/2012 | Malik | G06N 5/00 |
| | | | 706/12 |
| 2014/0029839 A1 | 1/2014 | Mensink | |
| 2014/0317034 A1* | 10/2014 | Kushnir | G06N 20/00 |
| | | | 706/20 |
| 2015/0161110 A1* | 6/2015 | Saiz | G06F 3/018 |
| | | | 704/3 |
| 2018/0012132 A1* | 1/2018 | Meadow | G06N 7/005 |
| 2018/0150728 A1 | 5/2018 | Vahdat | |
| 2018/0181559 A1* | 6/2018 | Matskevich | G06F 40/211 |
| 2020/0089653 A1* | 3/2020 | Hong | A61B 5/7267 |
| 2020/0104643 A1* | 4/2020 | Hu | G06N 3/0454 |
| 2020/0175564 A1* | 6/2020 | Kulasooriya | G06F 16/285 |
| 2020/0202253 A1* | 6/2020 | Tamura | G06N 20/00 |
| 2020/0242736 A1* | 7/2020 | Liu | G06K 9/628 |

OTHER PUBLICATIONS

Park, M., Kim, J., Kim, S., Liu, Y. and Choi, S., 2019. Mxml: Mixture of meta-learners for few-shot classification. arXiv preprint arXiv: 1904.05658. (Year: 2019).*

Duan, J., Li, X. and Mu, D., 2019. Learning Multi Labels from Single Label—An Extreme Weak Label Learning Algorithm. Wuhan University Journal of Natural Sciences, 24(2), pp. 161-168. (Year: 2019).*

International Search Report and Written Opinion dated Mar. 9, 2021 from International Application No. PCT/EP2020/083281, International Filing Date Nov. 25, 2020, 10 pages.

Jun, et al., "Multi-View Multi-Label Learning With View-Label-Specific Features", IEEE Access, vol. 7, Jul. 23, 2019, pp. 100979-100992.

Lakshminarayanan, et al., "Simple and Scalable Predictive Uncertainty Estimation using Deep Ensembles", 31st Conference on Neural Information Processing Systems (NIPS ), arXiv:1612.01474v3, Nov. 4, 2017, 15 pages.

Li, et al., "Reducing Over-confident Errors outside the Known Distribution", arXiv:1804.03166v3, May 6, 2019, 12 pages.

Park, et al., "MxML: Mixture of Meta-Learners for Few-Shot Classification", arXiv:1904.05658v1, Apr. 11, 2019, 12 pages.

"The new AI innovation equation", IBM, 14 pps., printed from the Internet on Oct. 16, 2019, <https://www.ibm.com/watson/advantage-reports/future-of-artificial-intelligence/ai-innovation-equation.html>.

Brodley et al, "Identifying and Eliminating Mislabeled Training Instances", 7 pps., printed from the Internet on Oct. 16, 2019, <http://citeseerx.ist.psu.edu/viewdoc/download?doi=10.1.1.13.4127&rep=rep1&type=pdf>.

Frenay et al., "A Comprehensive Introduction to Label Noise", ESANN 2014 proceedings, European Symposium on Artificial Neural Networks, Computational Intelligence and Machine Learning, Apr. 23-25, 2014, ISBN 978-287419095-7, pp. 667-675, <https://www.elen.ucl.ac.be/Proceedings/esann/esannpdf/es2014-10.pdf>.

Mishra et al., "A Generative Model for Zero Shot Learning Using Conditional Variational Autoencoders", 9 pps., Jan. 27, 2018, <https://arxiv.org/abs/1709.00663>.

Puget, "Wrong Labels In Supervised Learning (IT Best Kept Secret Is Optimization", IBM, Mar. 1, 2016, 2 pps., <https://www.imb.com/developerworks/community/blogs/jfp/entry/Some_Limit_To_Supervised_Learning?lang=en >.

Verma et al., "Generalized Zero-Shot Learning via Synthesized Examples", 9 pps., Jun. 12, 2018, <https://arxiv.org/abs/1712.03878>.

Xiao et al., "The Partitioning- and Rule-Based Filter for Noise Detection", pp. 205-210, © 2005 IEEE, <https://ieeexplore.ieee.org/document/1506474>.

Zhu et al., "Eliminating Class Noise in Large Datasets", Proceedings of the Twentieth International Conference on Machine Learning (ICML-2003), 8 pps., <https://www.aaai.org/Papers/ICML/2003/ICML03-119.pdf>.

"European Patent Office Response to Rule 161", Application No. EP201815753.7, dated Oct. 12, 2022, 6 pages.

* cited by examiner

DATA LABEL VERIFICATION USING FEW-SHOT LEARNERS

BACKGROUND OF THE INVENTION

The invention relates generally to label quality of a dataset, and more specifically, to verifying labels of records of a labeled dataset.

Artificial intelligence (AI) and machine learning (ML) are taking center stage in enterprises of any size and in every vertical industry. Although users are gaining more and more experience with ML technologies, the training of the algorithms remains a very time-consuming task. One area of heavy lifting is providing good training data, i.e., correctly labeled data for supervised learning. Thus, mislabeled data is an issue for a range of applications and methods in the machine learning field. The performance of machine learning classifiers is largely dependent on the quality of the data labels used for training and validation. In general, human supervision is required to obtain labels for datasets. The labeling process is therefore a) time-consuming and b) likely to contain errors (mislabels). Nevertheless, it should be noted that mislabeling may occur not only through human error but mislabeling may be an inherent part of collecting data, as described in several publications.

Detecting and correcting mislabeled data is of large interest for enterprise users, as mislabeled data affects directly the ML model performance. As datasets get larger, the process of verifying the labels manually is timewise not feasible, leading to the need for an automated detection of mislabeled data.

The next wave of AI innovation may likely be fueled by deep learning models trained using a method that lies somewhere between supervised and unsupervised learning. Computer scientists and engineers are exploring a number of such learning methods, some of which may offer a triple threat: less labeled data, less data volume and less human intervention. Among them, "one-shot learning" is closest to unsupervised learning. One-shot learning is based on the premise that most human learning takes place upon receiving just one or two examples.

One- or few-short learning is generally based on a "fast transfer" of previously learned concepts to new situations or objects not yet encountered. This could be achieved through hard coding, a well-defined rule set in the respective model, alternatively, by making use of priors in a Bayesian approach. Thus, the idea is based on facilitating learning by shared generalizable concepts.

Once characteristic concepts have been learned for a wide range of classes, the concepts may need to recognize non-visible categories (identified by independent labels) or allow example isolation to be characteristic of none of the categories available.

Some of the documents belonging to the general context of the here proposed concept comprise the document WO 2018/226492 A1. This document discloses methods and computer systems being instrumental for improving a trained to base deep neural network by structurally changing the base deep neural network to create an updated deep neural network, such that the updated deep neural network has no degradation in performance relative to the base deep neural network on the training data.

Additionally, the document U.S. Pat. No. 8,331,657 B2 discloses a computer-implemented pattern recognition method comprising: creating electronically a linkage between a plurality of models within a classifier module within a pattern recognition system such that anyone of the plurality of models may be selected as an active model in a recognition process, creating electronically a null hypothesis between at least one model of the plurality of link models and at least a second model among the plurality of link models, accumulating electronically evidence to accept or reject the null hypothesis, and transmitting a portion of the electronically accumulated evidence to a pattern classifier module. However, most of the known approaches so far rely on good labeled data.

Thus, on the road from supervised to completely unsupervised learning via transfer learning, reinforcement and one-shot learning the requirement for correctly labeled data remains high. Consequently, embodiments of the present invention propose how to increase the quality of labeled data.

SUMMARY

Aspects of the present invention disclose a method, computer program product, and system for verifying labels of records of a dataset. The records comprise sample data and a related label out of a plurality of labels. The method includes one or more processors dividing the dataset into a training dataset comprising records relating to a selected label and an inference dataset comprising records with sample data relating to the selected label and all other labels out of the plurality of labels. The method further includes one or more processors dividing the training dataset into a plurality of learner training datasets. A learner training dataset comprises at least one sample relating to the selected label. The method further includes one or more processors training a plurality of label-specific few-shot learners. The few-shot learners are trained with one of the plurality of learner training datasets. The method further includes one or more processors performing inference by the plurality of trained label-specific few-shot learners on the inference dataset to generate a plurality of sets of predicted label output values.

In a further embodiment, the method further includes one or more processors aggregating the predicted label output values within each set of the sets of predicted label output values, thereby generating a respective score value for each of the plurality of the label-specific few-shot learners, the respective score values reflecting a variability of the predicted selected label. In response to determining that at least a predefined number of score values are below a predefined variability threshold value, the method further includes one or more processors determining the dataset as verified regarding the selected label.

In an additional aspect of the present invention, the computer program product includes one or more computer readable storage media and program instructions stored on the one or more computer readable storage media, the program instructions comprising program instructions to divide the dataset into a training dataset comprising records relating to a selected label and an inference dataset comprising records with sample data relating to the selected label and all other labels out of the plurality of labels. The computer program product further includes program instructions that comprise to divide the training dataset into a plurality of learner training datasets. A learner training dataset comprises at least one sample relating to the selected label. The computer program product further includes program instructions to train a plurality of label-specific few-shot learners. The few-shot learners are trained with one of the plurality of learner training datasets. The computer program product further includes program instructions to perform inference by the plurality of trained label-specific few-shot learners on the inference dataset to generate a plurality of sets of predicted label output values.

In a further embodiment, the computer program product further includes program instructions to aggregate the predicted label output values within each set of the sets of predicted label output values, thereby generating a respective score value for each of the plurality of the label-specific few-shot learners, the respective score values reflecting a variability of the predicted selected label. In response to determining that at least a predefined number of score values are below a predefined variability threshold value, the computer program product further includes program instructions to determine the dataset as verified regarding the selected label.

In an additional aspect of the present invention, the computer system comprises one or more computer processors, one or more computer readable storage media, and program instructions stored on the computer readable storage media for execution by at least one of the one or more processors, the program instructions comprise program instructions to divide the dataset into a training dataset comprising records relating to a selected label and an inference dataset comprising records with sample data relating to the selected label and all other labels out of the plurality of labels. The computer system further includes program instructions to divide the training dataset into a plurality of learner training datasets. A learner training dataset comprises at least one sample relating to the selected label. The computer system further includes program instructions to train a plurality of label-specific few-shot. The few-shot learners are trained with one of the plurality of learner training datasets. The computer system further includes program instructions to perform inference by the plurality of trained label-specific few-shot learners on the inference dataset to generate a plurality of sets of predicted label output values.

In a further embodiment, the computer system further includes program instructions to aggregate the predicted label output values within each set of the sets of predicted label output values, thereby generating a respective score value for each of the plurality of the label-specific few-shot learners, the respective score values reflecting a variability of the predicted selected label. In response to determining that at least a predefined number of score values are below a predefined variability threshold value, the computer system further includes program instructions to determine the dataset as verified regarding the selected label.

The proposed computer-implemented method for verifying labels of records of a dataset may offer multiple advantages, technical effects, contributions and/or improvements.

Various aspects of the present invention can successfully overcome the problem of existing proposals for detecting mislabeled samples suffering from performance degradation where the rate of label noise is too high. Specifically, ensemble classifiers trained on (subsamples of) the same dataset to be checked for label errors may depend on the quality data trained on. The one- or few-shot learning modules trained on examples for which the ground truth is known or, labels are known with high confidence, are not prone to the aforementioned performance limitation; and therefore, provide an automated solution for a successful detection of mislabeled data examples. This is of general importance when working with data with labels (i.e., to ensure the correctness of the label data).

Thus, the proposed approach may automatically increase the label quality of labeled data for machine learning significantly and reliably even under the difficult conditions (e.g., a high degree of mislabels).

DETAILED DESCRIPTION

Figure 1:
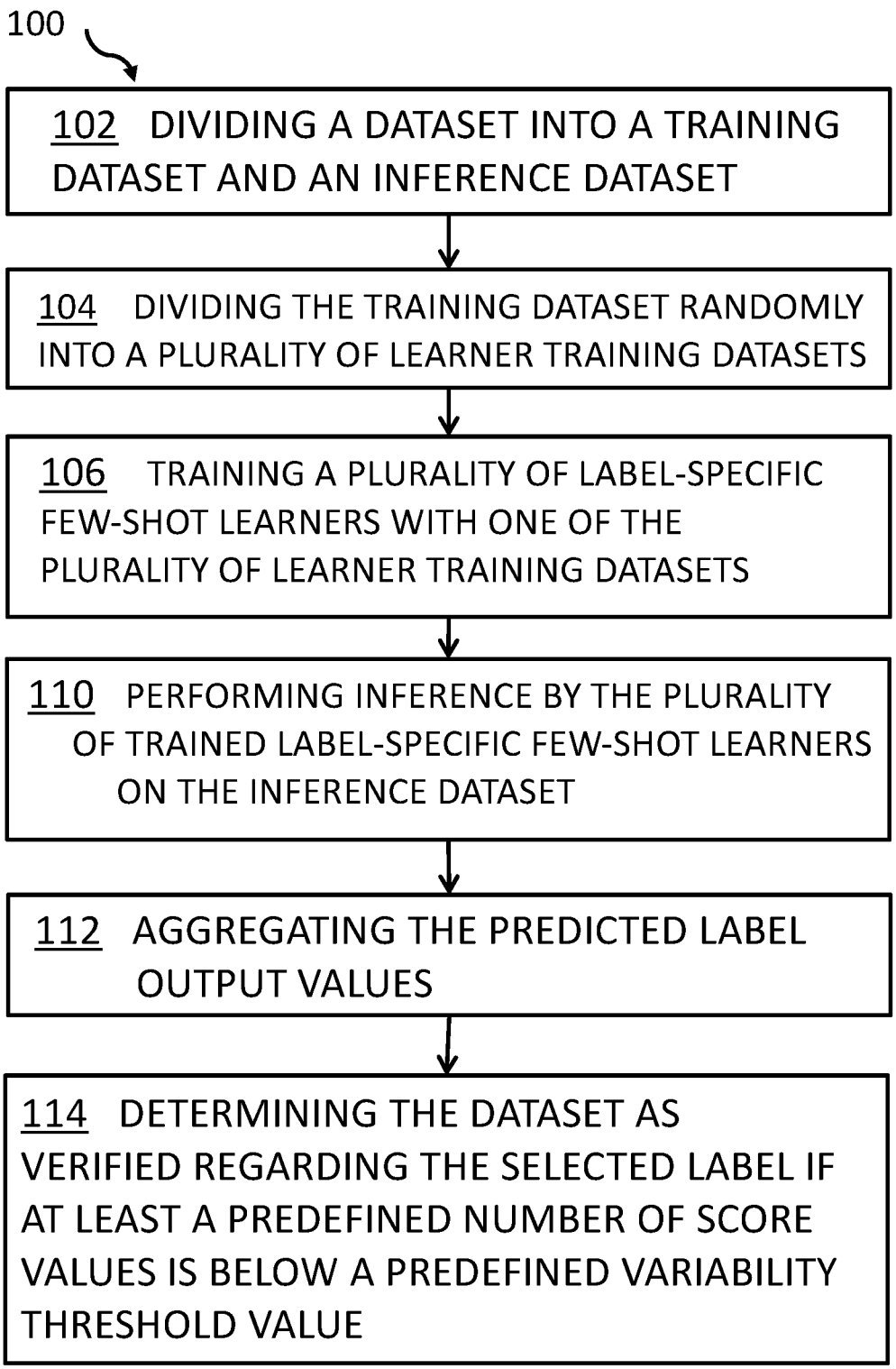
FIG. 1 shows depicts a block diagram of an embodiment of the inventive computer-implemented method for verifying labels of records of a dataset, in accordance with an embodiment of the present invention.

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited. Preferred embodiments of the invention will be described, by way of example only, and with reference to the following drawings.

In the context of this description, the following conventions, terms and/or expressions may be used:

The term 'machine learning' (ML) may denote a plurality of algorithms and statistical models that computer systems may use in order to perform a specific task effectively without using explicit instructions, relying on patterns and inference instead. The behavior of the algorithms is not performed in a procedural way. ML is seen as a subset of artificial intelligence (AI). ML algorithms build a mathematical model based on sample data, known as "training data", in order to make predictions or decisions without being explicitly programmed to perform the task. A typical implementation for ML may be based on a (deep) neural network.

The term 'inference' may denote the process of a trained machine learning system to new information. For example, the result of an inference process may be denoted as prediction or categorization into a class of a classifier for unknown data.

The term 'Bayesian inference' may denote a method of statistical inference in which Bayes' theorem is used to update the probability for a hypothesis as more evidence or information becomes available. Bayesian inference is an important technique in statistics, and especially in mathematical statistics. Bayesian updating is particularly important in the dynamic analysis of a sequence of data. One- or few-shot learners may be implemented using a 'Bayesian inference' model. Thereby, the Bayesian inference derives the posterior probability as a consequence of two antecedents: a prior probability and a "likelihood function" derived from a statistical model for the observed data. Bayesian inference computes the posterior probability according to Bayes' theorem.

The term 'dataset' may denote a plurality of records comprising data that may be used for training machine learning models. Beside the net training data, each record may also include a label that should describe the net data. For example, an image of an object may be seen as net training data, wherein the related label describes the content of the image. In an additional example, a scene on a street may show a car; thus, the label may be "car". However, other labels may also be used for the same scene (e.g., "traffic light," "pedestrian," "street," "walkway," "crossing," etc.), because the objects may also be shown in the image of the scene.

The term 'one- or few-shot learning' may generally be based on a "fast transfer" of previously learned concepts to new situations of objects not yet encountered. The one- or few-shot learning can be achieved through heart-coding of a well-defined routes at in a respective model or alternatively by making use of priors in a Bayesian approach. Thus, the concept is based on facilitating learning by shared generalized concepts. In other words, a one-shot learner is an object categorization problem solver, found often in computer vision. Whereas most machine learning based object categorization algorithms require training on hundreds or thousands of samples/images and very large datasets, one-shot learning (or few-shot learning) aims to learn information about object categories from one, or only a few, training samples/images.

Once characteristic concept for a wide range of classes have been learned, they may have to recognize yet unseen categories (e.g., distinguish between independent labels) or allow for an isolation of an example that is not characteristic for any of the available categories.

In the following, a detailed description of the figures will be given. All instructions in the figures are schematic. Firstly, a block diagram of an embodiment of the inventive computer-implemented method for verifying labels of records of a dataset is given. Afterwards, further embodiments, as well as embodiments of the data label verification system for verifying labels of records of a dataset, will be described.

FIG. 1 shows a block diagram of an example embodiment of the computer-implemented method 100 for verifying labels of records of a dataset, wherein the records comprises sample data and at least one related label out of a plurality of labels (e.g., a record may have labels u, w, v, x, y, z). The method 100 includes in step 102, dividing the dataset into a training dataset comprising records relating to one selected label (i.e., having a y-label, such as "cat") and an inference dataset comprising records with sample data relating to the selected label (i.e., the label "y") and all other labels out of the plurality of labels (i.e., labels u, w, v, x, z in the above example).

The method 100 also includes in step 104, dividing the training dataset (randomly, or according to another predefined approach) into a plurality of learner training datasets. The learner datasets can each include at least one sample relating to the selected (related) label. Then, the method 100 includes in step 106, training a plurality of label-specific few-shot learners with one of the plurality of learner training datasets. In example embodiments, the classifiers implemented as learners are classifiers with two output classes: good label y or bad label y, according to the above-mentioned example.

Furthermore, the method 100 includes in step 110 performing inference by the plurality of trained label-specific few-shot learners on the inference dataset (i.e., typically the complete inference dataset). In various embodiments, performing the inference can result in a plurality of sets of predicted label output values (i.e., one set for each few-shot learner, which is equivalent to one set for each learner training dataset because of the direct one-to-one relationship).

Additionally, the method 100 includes in step 112, aggregating the predicted label output values within each set of the sets of predicted label output values. Thereby, embodiments of the present invention can determine and provide a respective score value for each of the plurality of the label-specific few-shot learners. The respective score values reflect a variability of the predicted selected label. The variability may also be understood as labeling noise.

Further, the method 100 includes in step 114, determining the dataset as verified regarding the selected label (i.e., label "y," (e.g. "cat")) if at least a predefined number (or a predefined percentage) of score values is below a predefined variability threshold value. In addition, a low number of a score value may denote that the labels of records and the related sub-data are of good quality.

Figure 2:
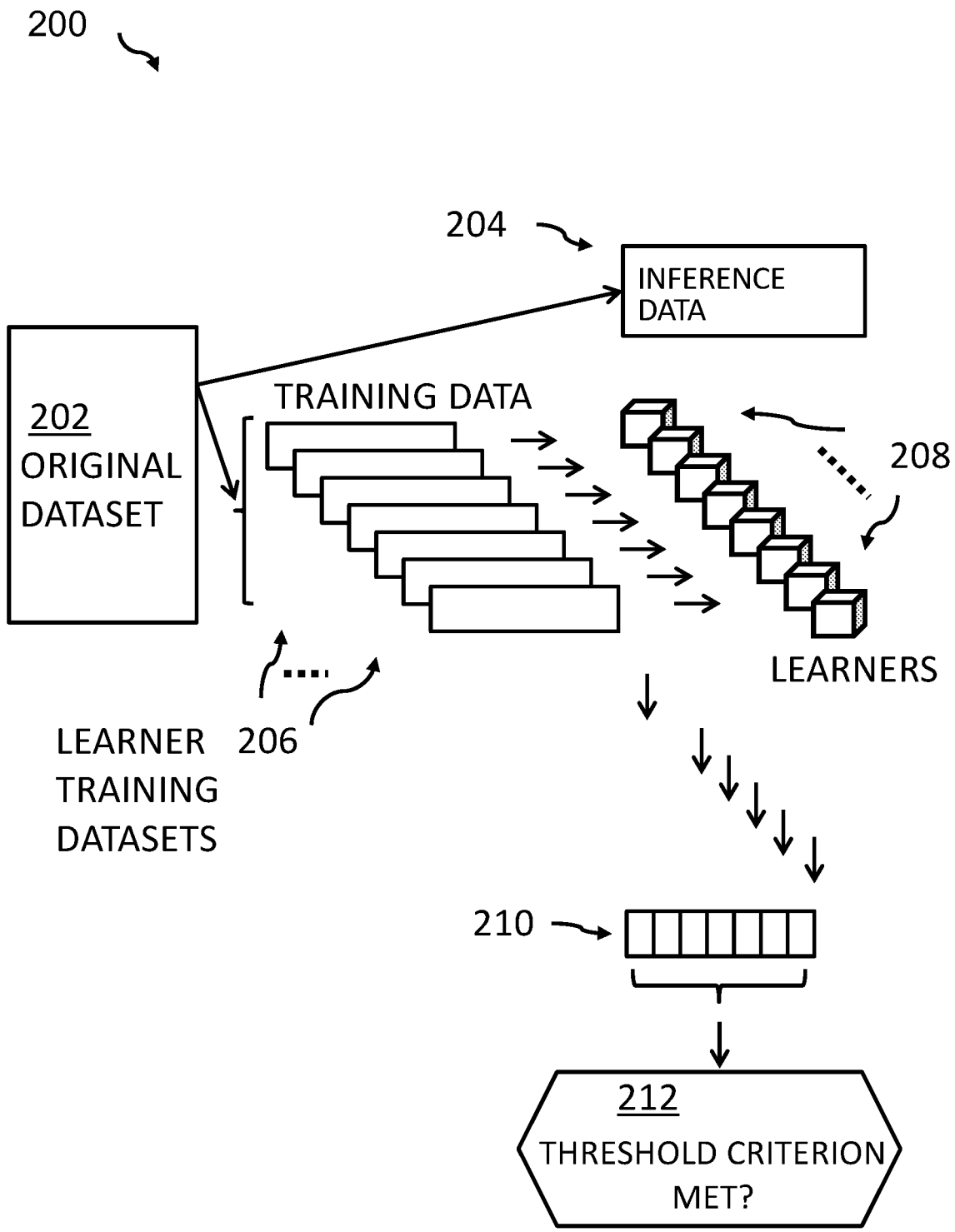
FIG. 2 shows depicts a block diagram of a more pictographic form of the here proposed method, in accordance with an embodiment of the present invention.

FIG. 2 depicts a block diagram 200, a pictographic form of the proposed method, in accordance with an embodiment of the present invention.

The original dataset 202 is split into two parts: the inference dataset 204 as well as training data, which are randomly (or according to another algorithm) split again, in particular in learner training datasets 206. In additional embodiments, a selected label (e.g., label "y") may be selected out of a potential plurality of labels for records of the dataset. However, in other embodiments, the records do not correspond to a plurality of labels. For example, if simple animal images have to be categorized/labeled, then the images can correspond to one label (e.g., "cat." "dog," . . . "dolphin," etc.).

Embodiments of the present invention can then use the learner training datasets to train label specific (i.e., here for label "y") learners 208 (i.e., classifiers). The learner training datasets have been pre-trained with another independent dataset to classify according to the chosen "y" label.

Each record of the learner training datasets 206 may (e.g., during an appearance) result in a prediction or predicted label output value (confidence level for "good label" or "bad label"). Thus, if a learner training dataset 206 includes a number capital F of records, also asked confidence level values are generated.

Next, embodiments of the present invention aggregate the predicted label output values (e.g., by determining an average value or an expectation value according to another algorithm), resulting in a vector 210 of consolidated, predicted label output value. In an example, one dimension of the vector may represent one learner training dataset 206. The related original dataset 202 may be regarded as verified if a threshold criterion is met (212). For example, based on whether at least a predefined number of the previously determined score values of the learner training datasets (the dimensions of the resulting vector) is below a predefined "correct label" threshold value.

Figure 3:
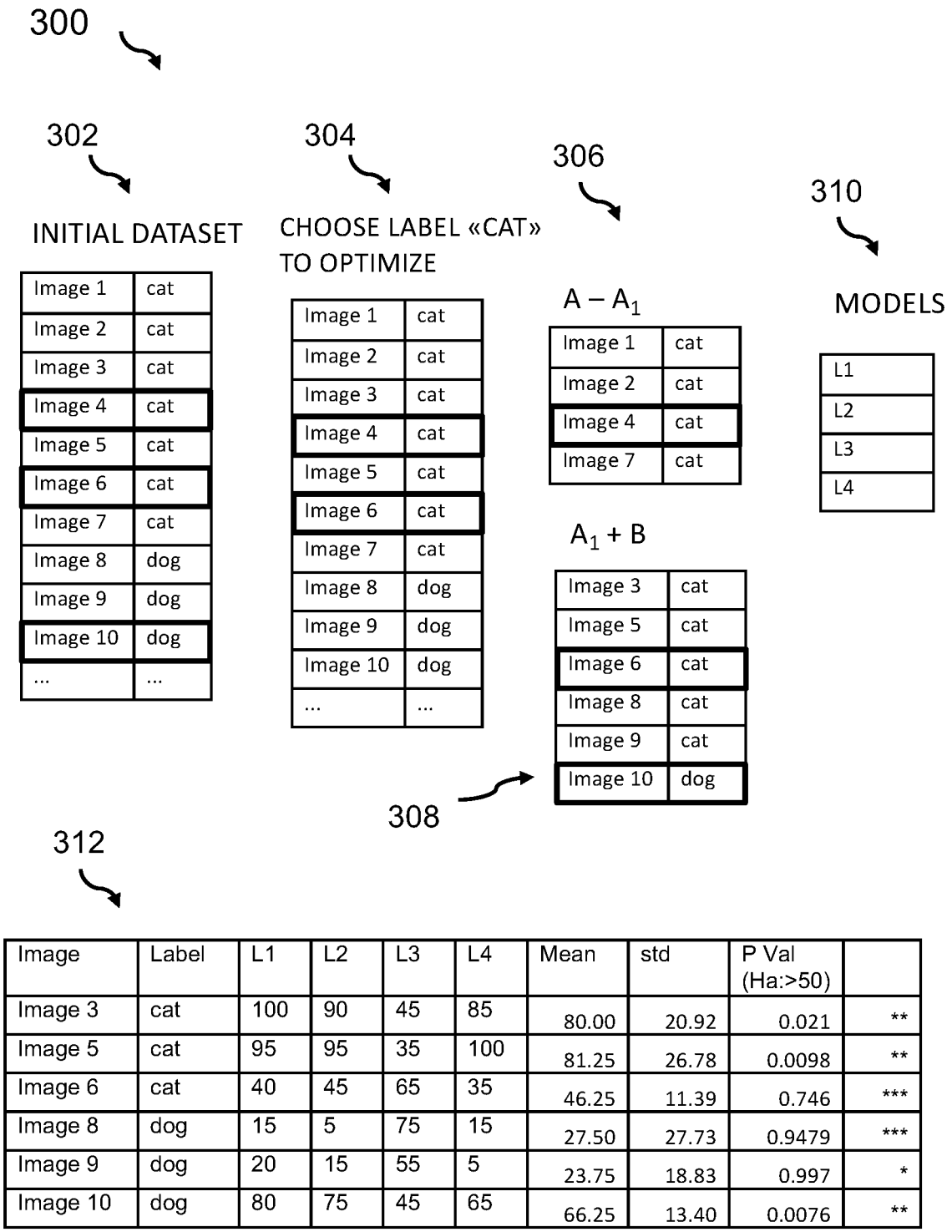
FIG. 3 shows depicts a series of matrices of a practical example for applying the proposed method, in accordance with an embodiment of the present invention.

FIG. 3 depicts a series of matrices 300 of a practical example for applying the proposed method 100, in accordance with an embodiment of the present invention. Matrix 302 represents the initial dataset (i.e., original dataset). In a first step, a label (e.g., "y") is chosen, which should be verified. The chosen label can be any of possibly multiple labels in the original dataset. The label can be symbolized by the exemplary black boxes around the image 4 and 6 having the label "cat."

In a second step, M individual draws (without replacement) from the subset of the matrix 302 with a positive label "y" (i.e., "cat") are made, which may be named subset A 306. The rest of the matrix 304 (with and without label y) is considered to be the reference, validation of inference dataset, also referred to as the subset A1+B, 308.

Then, the above-mention training is performed by using the one- or few-shot learners resulting in M trained models 310 (e.g., L1, L2, L3, L4, and potentially more models). In a fourth step, the previously trained M classifiers (i.e., one- or few-shot learners) are used on the sample of the subset A1+B, 308, which yields a predicted label for each model and each sample in A1+B, 308.

In a fifth step, the classification result values (i.e., predicted label output values) for every sample in A1+B, 308 are aggregated (e.g., an average value). The observed main metric is the predicted label (large variety validity corresponding to low confidence), which may also be formulated as label entropy. Then, in a sixth step determines whether the threshold criterion has passed (e.g., compare FIG. 2, 212) for the sub-set A1+B, 308. Matrix 312 depicts an example result of the aforementioned process. The two leftmost columns of matrix 312 correspond to matrix 308 (A1+B, 308). The "mean" column and the "std" column (standard deviation) represent the result of the aggregation.

As a criterion, the prediction value (P val, Ha>50%) is depicted in the second column from the right. A categorization can proceed according to the following traffic light algorithm: "cat": P val<0.05 "**" (yellow), not "cat"; not "cat": P val >0.95 "*" (green); not passed: "***" (red). The aforementioned partial process can be seen as a first iteration (i=1). A second iteration is illustrated in FIG. 4.

Figure 4:
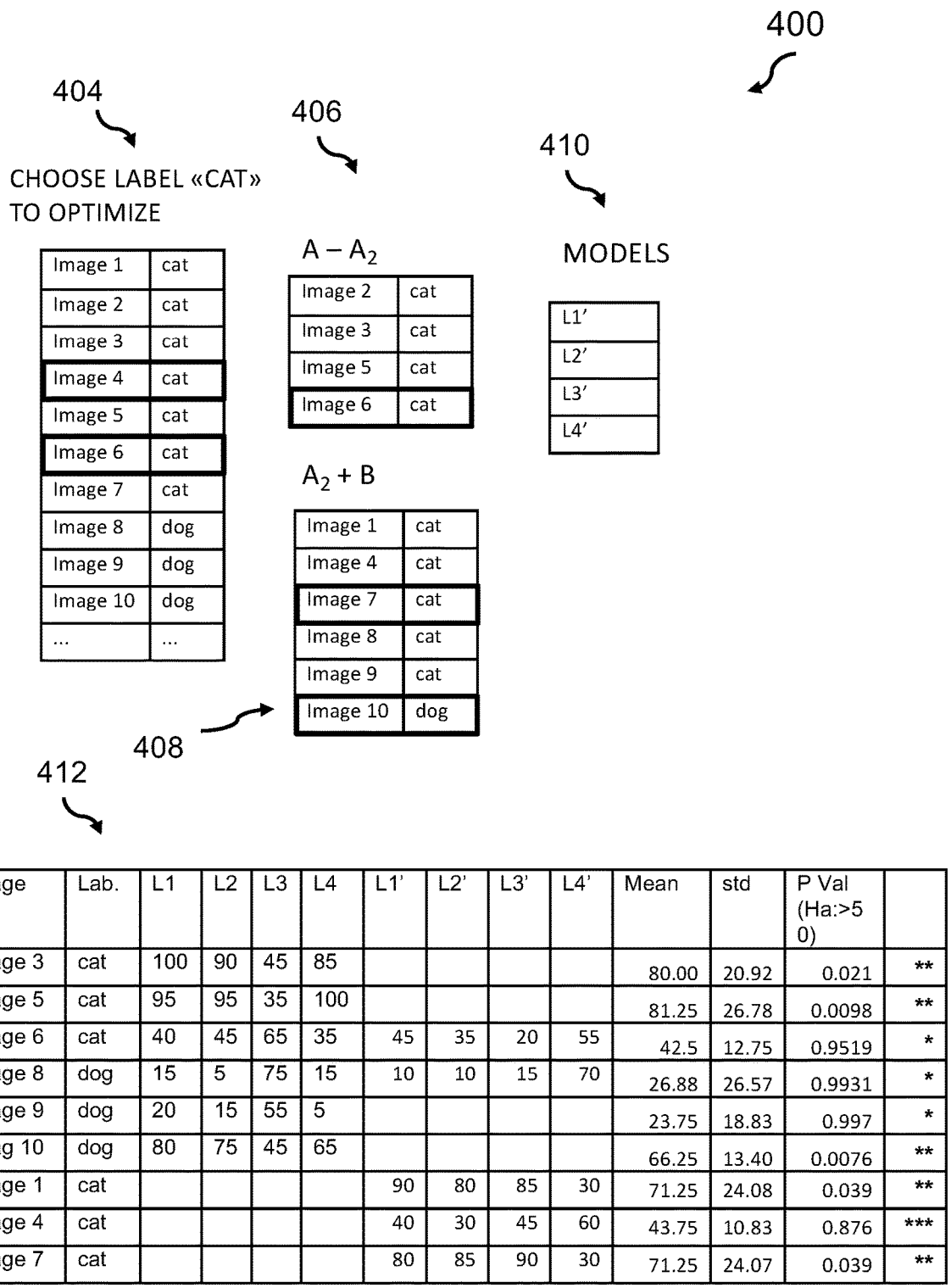
FIG. 4 shows depicts a series of matrices associated with of the same example as used in FIG. 3, in accordance with an embodiment of the present invention.

FIG. 4 depicts a series of matrices 400, associated with the example as used in FIG. 3 during a second iteration (i=2), in accordance with an embodiment of the present invention.

As y-label, again "cat" is used for the optimization process as can be seen in the matrix 404. Again, a split into a training dataset (A-A2, 406) and an interference dataset (A2+B, 408) is made resulting in other models 410 L1', L2', L3', L4' of the exemplary learners.

Matrix 412 depicts the resulting matrix of the aforementioned process of FIG. 3 and FIG. 4. Utilizing the same end criteria as above in FIG. 3, as well as the conditions for the traffic light schema, the second line from the bottom of the matrix with P val=0.876 marks a "not passed."

In additional steps of the proposed method, embodiments of the present invention can perform additional iterations (i=3, 4, 5, . . . ). If all samples have been classified as "cat" or "not cat," then the process may move to the next label which is shown in FIG. 5.

Figure 5:
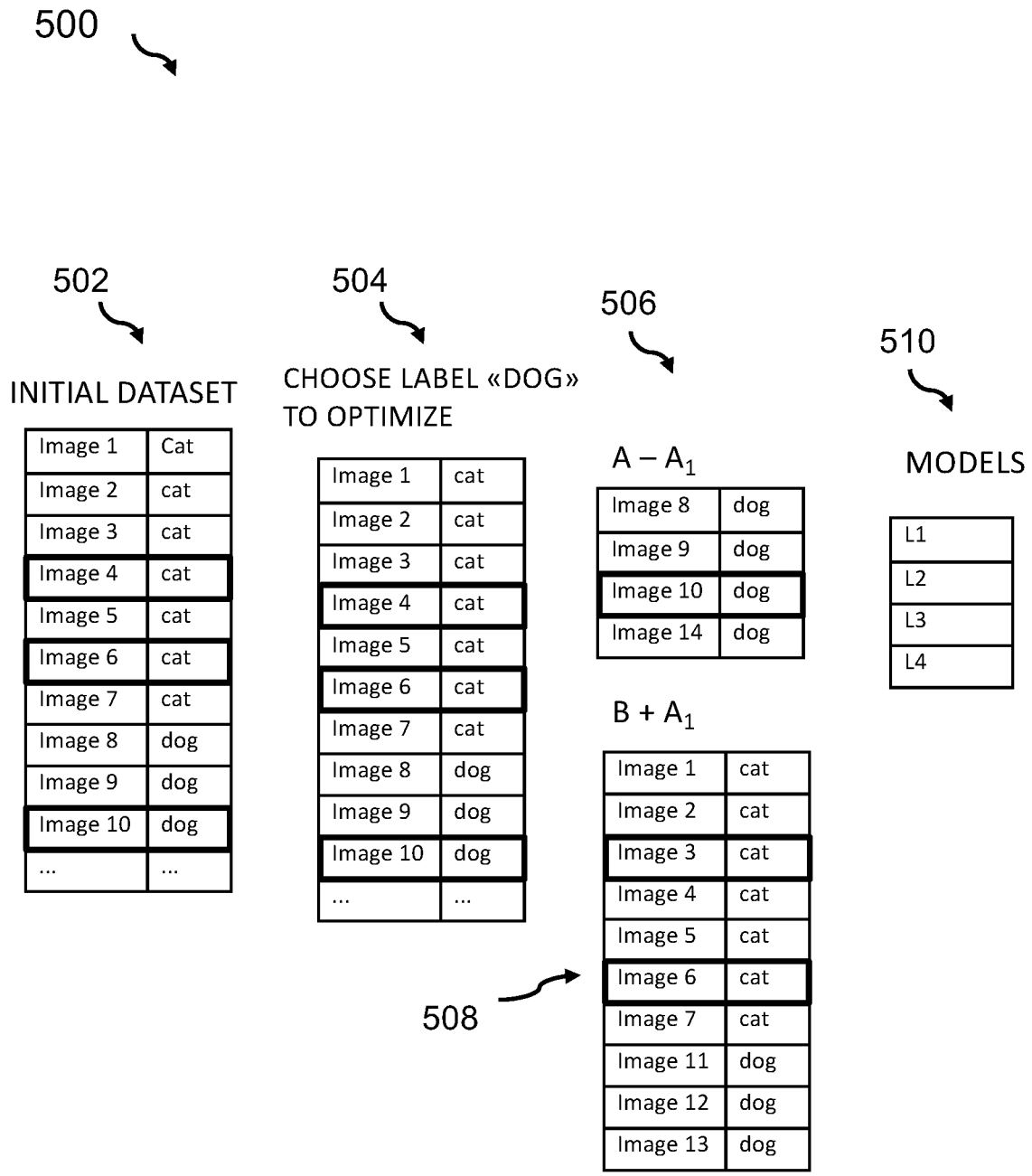
FIG. 5 shows depicts a series of matrices of associated with the same example as used in FIG. 3 and FIG. 4, in accordance with an embodiment of the present invention.

FIG. 5 depicts a series of matrices 500 of the same example as used in FIG. 3 and FIG. 4, in accordance with an embodiment of the present invention. However, in FIG. 5, the label y "dog" is chosen (matrix 504). Given the above explained examples in FIG. 3 and FIG. 4, the matrices 502 label "dogs" are chosen, a training dataset 506 A-A1 is separated from an inference dataset B+A1, 508 resulting again in different models 510 L1, L2, L3, L4. The assessment of the resulting matrix of aggregated predicted label output values proceeds, as explained above.

Figure 6:
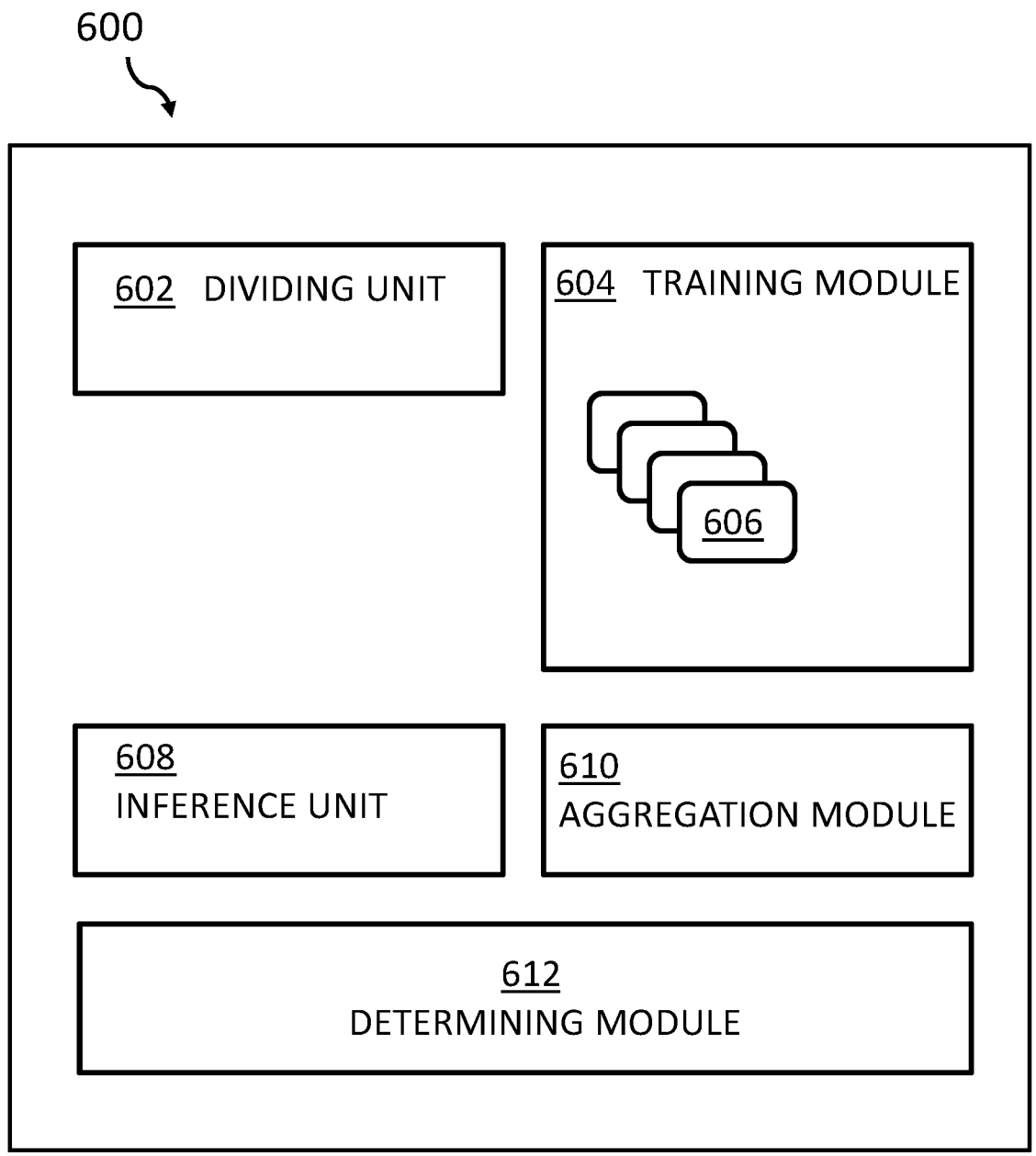
FIG. 6 shows depicts an embodiment of label verification system for verifying labels of records of a dataset, in accordance with an embodiment of the present invention.

For completeness reasons, FIG. 6 depicts a block diagram of system 600 of the data label verification system for verifying labels of records of a dataset, in accordance with an embodiment of the present invention. In various embodiments, system 600 includes modules and components that operate to perform the processing of method 100 (FIG. 1), in accordance with embodiments of the present invention.

In addition, the records include sample data and a related label out of a plurality of labels. The system 600 comprises a dividing unit 602, adapted for dividing the dataset into a training dataset comprising records relating to one selected label and an inference dataset comprising records with sample data relating to the selected label and all other labels out of the plurality of labels. Thereby, the dividing unit 602 is also adapted for dividing the training dataset randomly into a plurality of learner training datasets, which comprise each at least one sample relating to the selected label.

The system 600 also comprises a training module 604 adapted for training a plurality of label-specific few-shot learners 606, each of the few-shot learners 606 being trained with one of the plurality of learner training datasets. System 600 also includes an inference unit 608, adapted for performing inference by the plurality of trained label-specific few-shot learners 606 on the inference dataset resulting in a plurality of sets of predicted label output values.

Additionally, the system 600 comprises an aggregation module 610, adapted for aggregating the predicted label output values within each set of the sets of predicted label output values, thereby providing a respective score value for each of the plurality of the label-specific few-shot learners (corresponding to a related specific learner training dataset). Accordingly, the respective score values reflect a variability of the predicted, selected label, and a determining module 612 adapted for determining the dataset as verified regarding the selected label if at least a predefined number of score values is below a predefined variability threshold value.

Figure 7:
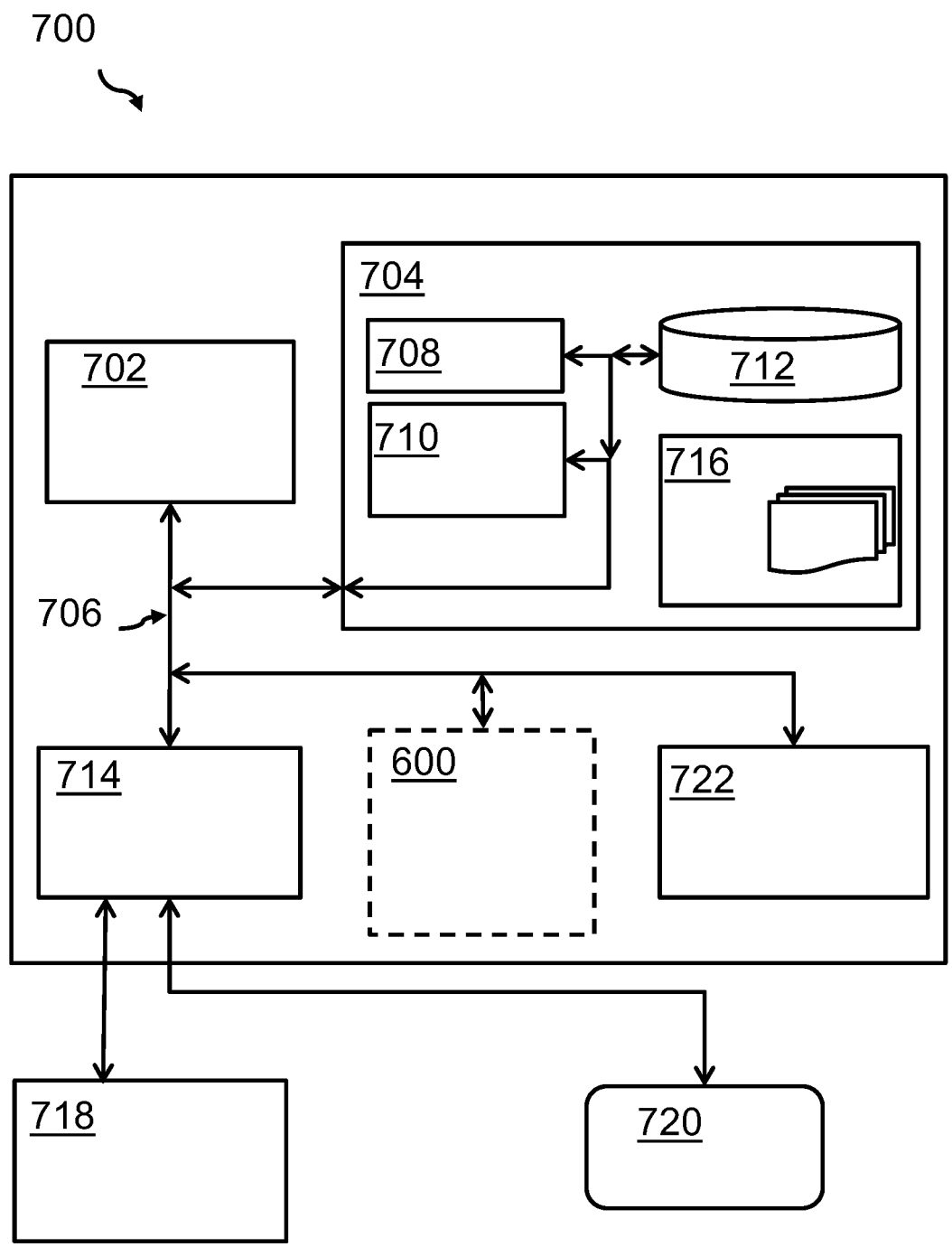
FIG. 7 shows depicts an embodiment of a computing system comprising the label verification system according to FIG. 6, in accordance with an embodiment of the present invention.

Embodiments of the invention may be implemented together with virtually any type of computer, regardless of the platform being suitable for storing and/or executing program code. FIG. 7 shows, as an example, a computing system 700 suitable for executing program code related to the proposed method.

The computing system 700 is only one example of a suitable computer system, and is not intended to suggest any limitation as to the scope of use or functionality of embodiments of the invention described herein, regardless of whether the computer system 700 is capable of being implemented and/or performing any of the functionality set forth hereinabove. In the computer system 700, there are components, which are operational with numerous other general purpose or special purpose computing system environments or configurations. Examples of well-known computing systems, environments, and/or configurations that may be suitable for use with computer system/server 700 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 700 may be described in the general context of computer system-executable instructions, such as program modules, being executed by a computer system 700. Generally, program modules may include routines, programs, objects, components, logic, data structures, and so on that perform particular tasks or implement particular abstract data types. Computer system/server 700 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 700 is shown in the form of a general-purpose computing device. The components of computer system/server 700 may include, but are not limited to, one or more processors or processor 702, a system memory 704, and a bus system 706 that couple various system components including system memory 704 to the processor 702. Bus system 706 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 700 typically includes a variety of computer system readable media. Such media may be any available media that is accessible by computer system/server 700, and it includes both, volatile and non-volatile media, removable and non-removable media.

The system memory 704 may include computer system readable media in the form of volatile memory, such as random-access memory (RAM) 708 and/or cache memory 710. Computer system/server 700 may further include other removable/non-removable, volatile/non-volatile computer system storage media. By way of example only, a storage system 712 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus system 706 by one or more data media interfaces. As will be further depicted and described below, memory 704 may include at least one program product having a set (e.g., at least one) of program modules that are configured to carry out the functions of embodiments of the invention.

The program/utility, having a set (at least one) of program modules 716, may be stored in memory 704 by way of example, and not limiting, as well as an operating system, one or more application programs, other program modules, and program data. Each of the operating systems, one or more application programs, other program modules, and program data or some combination thereof, may include an implementation of a networking environment. Program modules 716 generally carry out the functions and/or methodologies of embodiments of the invention, as described herein.

The computer system/server 700 may also communicate with one or more external devices 718 such as a keyboard, a pointing device, a display 720, etc.; one or more devices that enable a user to interact with computer system/server 700; and/or any devices (e.g., network card, modem, etc.) that enable computer system/server 700 to communicate with one or more other computing devices. Such communication can occur via Input/Output (I/O) interfaces 714. Still yet, computer system/server 700 may communicate with one or more networks such as a local area network (LAN), a general wide area network (WAN), and/or a public network (e.g., the Internet) via network adapter 722. As depicted, network adapter 722 may communicate with the other components of the computer system/server 700 via bus system 706. It should be understood that, although not shown, other hardware and/or software components could be used in conjunction with computer system/server 700. Examples, include, but are not limited to: microcode, device drivers, redundant processing units, external disk drive arrays, RAID systems, tape drives, and data archival storage systems, etc.

Additionally, data label verification system 600 for verifying labels of records of a dataset may be attached to the bus system 706.

The descriptions of the various embodiments of the present invention have been presented for purposes of illustration but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for verifying labels of records of a dataset, wherein the records comprise sample data and a related label out of a plurality of labels, the method comprising:
dividing, by one or more processors, the dataset into a training dataset comprising records relating to a selected label and an inference dataset comprising records with sample data relating to the selected label and all other labels out of the plurality of labels;
dividing, by the one or more processors, the training dataset into a plurality of learner training datasets each of which trains one corresponding label-specific few-shot learner, wherein a learner training dataset comprises at least one sample relating to the selected label;
training, by the one or more processors, a plurality of label-specific few-shot learners, wherein the few-shot learners are trained with respective ones of the plurality of learner training datasets;
performing, by the one or more processors, inference by the plurality of trained label-specific few-shot learners on the inference dataset;
generating, by the one or more processors, a plurality of sets of predicted label output values, based on the inference, wherein respective ones of the sets of the predicted label output values are corresponding to respective ones of the trained label-specific few-shot learners;
aggregating, by the one or more processors, the predicted label output values in each of the sets, to generate respective score values for respective ones of the label-specific few-shot learners, wherein the respective score values reflect variability of prediction of the selected label; and
in response to determining that at least a predefined number of score values are below a predefined variability threshold value, verifying, by the one or more processors, the selected label for the dataset.

2. The method according to claim 1, wherein at least one of the few-shot learners is a one-shot learner.

3. The method according to claim 1, wherein at least one of the few-shot learners is using a Bayesian few-shot learning algorithm.

4. The method according to claim 1, further comprising:
training, by the one or more processors, one of the plurality of label specific few-shot learners with the records of the dataset relating the selected label.

5. The method according to claim 1, wherein each of the plurality of label specific few-shot learners has been pre-trained with data samples relating to the selected label.

6. The method according to claim 1, further comprising:
in response to determining that none of the plurality of learner training datasets result in a confidence level above a confidence threshold level, dividing, by the one or more processors, the dataset into a second training dataset comprising records relating to a second selected label and a second inference dataset comprising records with sample data relating to the second selected label and all other labels out of the plurality of labels.

7. The method according to claim 6, further comprising:
increasing, by the one or more processors, the number of the plurality of learner training datasets from one repetition cycle to a next repetition cycle until a measured improvement of the results is below a predefined threshold value.

8. The method according to claim 6, further comprising:
decreasing, by the one or more processors, the number of the training dataset by removing training datasets with low confidence levels and keeping learner training datasets of the plurality of learner training datasets which result in high confidence levels of the related labels for a next repetition cycle.

9. The method according to claim 1, wherein each of the plurality of label-specific few-shot learners is adapted for a classification in two classes comprising a fit-to-label class and a not-fit-to-label class.

10. The method according to claim 1, wherein dividing the dataset into a training dataset comprising records and an inference dataset further comprises:
sorting, by the one or more processors, the sample data according to known confidence level of a respective related label; and
selecting, by the one or more processors, a portion of sample data for the training dataset such that the sample data of the portion have higher confidence levels of the related label than the remaining portion of the dataset.

11. The method according to claim 1, further comprising:
upon determining a record having a related confidence level in the dataset, adding, by the one or more processors, the respective record to the training dataset.

12. A computer program product for verifying labels of records of a dataset, wherein the records comprise sample data and a related label out of a plurality of labels, the computer program product comprising:
one or more computer readable storage media and program instructions stored on the one or more computer readable storage media, the program instructions comprising:
program instructions to divide the dataset into a training dataset comprising records relating to a selected label and an inference dataset comprising records with sample data relating to the selected label and all other labels out of the plurality of labels;
program instructions to divide the training dataset into a plurality of learner training datasets each of which trains one corresponding label-specific few-shot learner, wherein a learner training dataset comprises at least one sample relating to the selected label;
program instructions to train a plurality of label-specific few-shot learners, wherein the few-shot learners are trained with respective ones of the plurality of learner training datasets;
program instructions to perform inference by the plurality of trained label-specific few-shot learners on the inference dataset;
program instructions to generate a plurality of sets of predicted label output values based on the inference, wherein respective ones of the sets of the predicted label output values are corresponding to respective ones of the trained label-specific few-shot learners;
program instructions to aggregate the predicted label output values in each of the sets, to generate respective score values for respective ones of the label-specific few-shot learners, wherein the respective score values reflect variability of prediction of the selected label; and
program instructions to verify the selected label for the dataset, in response to determining that at least a predefined number of score values are below a predefined variability threshold value.

13. The computer program product of claim 12, wherein at least one of the few-shot learners is a one-shot learner.

14. The computer program product of claim 12, wherein at least one of the few-shot learners is using a Bayesian few-shot learning algorithm.

15. The computer program product of claim 12, further comprising program instructions, stored on the one or more computer readable storage media, to:
train one of the plurality of label specific few-shot learners with the records of the dataset relating the selected label.

16. A computer system for verifying labels of records of a dataset, wherein the records comprise sample data and a related label out of a plurality of labels, the computer system comprising:
one or more computer processors;
one or more computer readable storage media; and
program instructions stored on the computer readable storage media for execution by at least one of the one or more processors, the program instructions comprising:
program instructions to divide the dataset into a training dataset comprising records relating to a selected label and an inference dataset comprising records with sample data relating to the selected label and all other labels out of the plurality of labels;
program instructions to divide the training dataset into a plurality of learner training datasets each of which trains one corresponding label-specific few-shot learner, wherein a learner training dataset comprises at least one sample relating to the selected label;
program instructions to train a plurality of label-specific few-shot learners, wherein the few-shot learners are trained with respective ones of the plurality of learner training datasets;
program instructions to perform inference by the plurality of trained label-specific few-shot learners on the inference dataset;
program instructions to generate a plurality of sets of predicted label output values based on the inference, wherein respective ones of the sets of the predicted label output values are corresponding to respective ones of the trained label-specific few-shot learners;
program instructions to aggregate the predicted label output values in each of the sets, to generate respective score values for respective ones of the label-specific few-shot learners, wherein the respective score values reflect variability of prediction of the selected label; and
program instructions to verify the selected label for the dataset, in response to determining that at least a predefined number of score values are below a predefined variability threshold value.

17. The computer system of claim 16, wherein at least one of the few-shot learners is a one-shot learner.

18. The computer system of claim 16, wherein at least one of the few-shot learners is using a Bayesian few-shot learning algorithm.

19. The computer system of claim 16, the program instructions further comprising:
train one of the plurality of label specific few-shot learners with the records of the dataset relating the selected label.

20. The computer system of claim 16, wherein each of the plurality of label specific few-shot learners has been pre-trained with data samples relating to the selected label.

* * * * *